US012090615B1

(12) United States Patent
Butzen

(10) Patent No.: US 12,090,615 B1
(45) Date of Patent: Sep. 17, 2024

(54) BATTERING RAM DEVICE AND SYSTEM

(71) Applicant: Chad M. Butzen, Sheboygan, WI (US)

(72) Inventor: Chad M. Butzen, Sheboygan, WI (US)

( * ) Notice: Subject to any disclaimer, the term of this patent is extended or adjusted under 35 U.S.C. 154(b) by 0 days.

(21) Appl. No.: 17/955,541

(22) Filed: Sep. 29, 2022

Related U.S. Application Data

(60) Provisional application No. 63/311,733, filed on Feb. 18, 2022.

(51) Int. Cl.
*B25D 1/00* (2006.01)
*A62B 3/00* (2006.01)

(52) U.S. Cl.
CPC ................ *B25D 1/00* (2013.01); *A62B 3/005* (2013.01)

(58) Field of Classification Search
CPC ............. A62B 3/005; B25D 1/00; B25G 1/04
See application file for complete search history.

(56) References Cited

U.S. PATENT DOCUMENTS 4,681,171 A * 7/1987 Kee .......................... B25D 1/00 173/90
5,067,237 A * 11/1991 Holder ................... A62B 3/005 72/325
5,177,850 A * 1/1993 Hull ......................... B25D 1/00 29/254
5,329,685 A * 7/1994 Gillespie ................ A62B 3/005 173/90
5,398,773 A * 3/1995 Baker ...................... B25D 1/16 173/90
5,810,333 A * 9/1998 Hickerson .............. A62B 3/005 254/133 R
6,035,946 A * 3/2000 Studley .................. A62B 3/005 173/90
7,490,813 B1 * 2/2009 Weddle ..................... B66F 3/24 248/354.1
7,735,172 B2 * 6/2010 Newton .................... B25F 1/00 7/166
7,900,538 B2 * 3/2011 Phillips .................. A62B 3/005 81/20
8,720,027 B2 * 5/2014 Dapkins, Jr. ........... A62B 3/005 29/270
9,341,303 B1 * 5/2016 Osborne .................. B25G 1/04
9,816,659 B1 * 11/2017 Osborne ................. F16L 55/46
10,821,308 B1 * 11/2020 Krumrei .................. B25D 9/02
11,497,944 B2 * 11/2022 Wright ................... A62B 3/005
2004/0108121 A1 * 6/2004 Lowther ................. B21D 1/06 173/90
2007/0017321 A1 * 1/2007 Doney ..................... B25G 1/04 81/20
2009/0000097 A1 * 1/2009 Dapkins, Jr. ........... A62B 3/005 173/90
2010/0089205 A1 * 4/2010 Phillips .................. A62B 3/005 81/20
2010/0170688 A1 * 7/2010 Delia ....................... B25D 1/14 173/90

(Continued)

*Primary Examiner* — Joshua G Kotis
(74) *Attorney, Agent, or Firm* — Mandy L. Tran, Esq.; CERES Patent & Technology, LLC

(57) ABSTRACT

The invention herein pertaining to a battering ram device and system of assembly. The device pertaining to a battering ram with improved ergonomic features that maximizes force exerted with minimum twerk to the user's body. The system of assembly introduced by this invention relates to detachably connectable features that provides modular options and capabilities of this tool.

8 Claims, 6 Drawing Sheets

(56) References Cited

U.S. PATENT DOCUMENTS

| | | | | |
|---|---|---|---|---|
| 2011/0113929 | A1* | 5/2011 | Lemelin | B25D 1/02<br>81/22 |
| 2012/0098282 | A1* | 4/2012 | Langan | B25G 3/30<br>7/167 |
| 2013/0326832 | A1* | 12/2013 | Resh | B25G 1/04<br>81/489 |
| 2016/0288311 | A1* | 10/2016 | Ferris | B25D 1/00 |
| 2022/0184426 | A1* | 6/2022 | Staton | A47L 13/254 |
| 2023/0241757 | A1* | 8/2023 | Billingsley | B25G 3/32<br>294/51 |

* cited by examiner

BATTERING RAM DEVICE AND SYSTEM

CROSS REFERENCE TO RELATED APPLICATIONS

This nonprovisional utility patent application incorporates by reference in its entirety and claims benefit to provisional patent application No. 63/311,733, having the filing date of Feb. 18, 2022, pursuant to 35 U.S.C. § 119(e).

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

BACKGROUND OF THE INVENTION

Field of the Invention

The invention herein pertaining to a battering ram device and system of assembly.

Background

Battering rams have historically served as an effective military tool to siege through physical blockades in order to gain quick access to blocked areas or space. This tool is useful in any similar context, whether relating to gaining access by a firefighter or security officer through a locked or blocked space, or by military officials attempting to gain entry through a fortified area. The core concept of battering ram technology is fairly basic in that a heavy linear object is manually held by two hands of a human user wherein the object is swung rearward to forward along either left or right side of the user's body. The body of the user serves as the fulcrum of the swinging movement. The effectiveness of any given battering ram device considers the success of breaching a blockade, the speed of breach, and the level of damage or impact its use has on the user's body.

Early technology in this realm comprised heavy linear blocks of dense and durable material such as wood or metal, having a handle element disposed thereon or around it for a tight grip and swinging action.

For example, U.S. Pat. No. 5,329,685 provides a simple version of a breaching tool, which comprises a singular body with two handles, both located on the top portion of the device. The device having pneumatic features to enhance the power released on impact. U.S. Pat. No. 7,490,813 discloses a nested two piece main body in a telescoping manner such that one of said nested two pieces is extendable with force by means of hydraulic power.

U.S. Patent Application No. 20100089205 provides for an ergonomically portable and storage friendly battering ram device wherein the device is detachable and can be reassembled along its linear half in a safe and secure manner for effective use. U.S. Patent Application No. 20090000097 provides for a simple ramming device wherein the distal end is connected to a plate element for increasing surface area of impact. Said plate element further having a claw shape at its bottom end to provide a dual benefit as a pry bar.

The existing battering ram tools among the disclosed prior art are primarily singular in function in that their primary shape and intended use are for the sole purpose of breaching barriers and blockades. One motivation for such singular design may have to do with safety concerns to the user. Given the heavy power exerted by such device so closely to the user's body, minimal unevenness to the surface and shape of the device and minimal moving parts will avoid incidental injuries associated with their contact or release. Another motivation for such a singular focus in design may have to do with fluid timing of action. It may be cumbersome to contend with reconfiguration of separate parts in between usage with increased errors if smaller parts are missing. Having singular whole devices that are ready for immediate use may be the safer and more efficient option, even though this would mean more heavy tools to carry for all the various needs that may be anticipated.

The challenge remains in this industry to be effective in life threatening tactical scenarios where access and control over fortified area needs to be gained stealthily, quickly, and as safely as possible. The focus in these situations having to do with assessing fortified access points, gaining access to entry by physical breach, and securing both entry and exit options to the breached site. Achieving these phases of locational control involves necessary tools such as battering rams and prying tools. Further, these such tools must also be capable of handling by an adult human in a safe manner. There remains a need for an ergonomically safe and effective tool that can achieve the above described qualities of performance and effect. The tool must be designed in such a way to ensure reliable results in variable landscapes and scenarios. The tool must further be portable to ensure quick and easy access by the user at any moment of need.

SUMMARY AND DESCRIPTION OF INVENTION

Note that all patents and applications referred herein are incorporated by reference in their entirety. Furthermore, where a definition or use of a term in a reference, which is incorporated by reference herein is inconsistent or contrary to the definition of that term provided herein, the definition of that term provided herein applies and the definition of the term in the reference does not apply.

The invention herein pertaining to a battering ram device and system of assembly. The device pertaining to a battering ram with improved ergonomic features that maximizes force exerted with minimum torque to the user's body. This effect is achieved by unique design features and combination of features which do not exist in the prior art. The system of assembly introduced by this invention relates to detachably connectable features that provide modular options and capabilities. These features will be described in greater detail as follows.

A battering ram device comprising a linear hollow tube, preferably cylindrical in shape. A first handle is disposed at the rear end or distal end of the linear hollow tube and a contact tool feature is located at the proximal or front end of said linear hollow tube. A second handle is disposed forward from said first handle, extending from the surface of said linear hollow tube. Said first and second handles are preferably disposed along the same linear path along the length of said linear hollow tube. Said second handle may be static in construction or alternatively adjustable in a rotatable manner to enable the user to flexibly adjust their hand grip over the device while the device is in use and shifting position midair in motion. Said first and second handle having a linear grip wherein the linear grip of said first and second handles are parallel to each other such that a user's grip between left and right hands are directed to be in parallel with each other when said device is in use. Parallel grip between right and left hands allows the user to swing the device in a rotating motion around the user's body, where the body serves as a fulcrum leverage for maximum fluidity and least amount of torque to the body.

Said linear hollow tube having perforated holes along its surface to allow pressured forced air to be released with movement and impact when in use. Said perforated holes are preferably located near the rear end of said linear hollow tube. The release of air pressure through perforated holes near the rear end of the linear hollow tube helps to diffuse impact force that radiates from the contact tool feature towards the first handle. The captured internal air force would otherwise reflect towards the user's grip if not released or diffused, hurting the user's gripping hand. Said perforated holes providing additional beneficial features wherein light that is shone into the internal space of said linear hollow tube will radiate outward of each hole of said perforated holes to create narrow lighting for the surrounding external environment when used in a dark space. This effect of said perforated holes helps to disperse light in a narrowly concentrated manner such that discreteness is preserved while providing visual enhancement.

At the center of the cross-sectional end at the distal end of said linear hollow tube, a threaded hole or threaded sleeve opening is provided wherein a flashlight may be snuggly sleeved in and securely connectable by threaded manner. The threaded feature of this portion of the device is adaptable to the threading of the head of a typical commercial linear portable handheld flashlight in matching manner. Where the cover element of a typical hand-held flashlight is removable by threaded manner, exposing the LED or bulb elements of the flashlight, may be attached by its exposed threading at that head portion (the location of the LED or bulb elements) to a matching threading within the internal space of said linear hollow tube at its distal end to connect the two devices together. Essentially, the device of this invention takes advantage and makes use of available threading of a standard commercial handheld flashlight by removal of the light cover and exposing the threading underneath. The line of sight and line of lumination of the flashlight when it is attached and in use is shared between the proximal end and distal ends of said linear hollow device such that light shone from the distal end is dispersed through an optional perforated hole at the cross-sectional end of the proximal end of said linear hollow tube. The importance of positioning the flashlight internally within the linear hollow tube as opposed to an external position (i.e. attaching the device on the outer surface of said linear hollow tube) is to avoid creating a protrusion from the surface of said device. Unlike other tools that involves a lighting element, a high impact tactical tool such as a battering ram will undergo variable and forceful degrees and types of physical impact between the user and a barrier. Any external protrusion on said device has a likely chance of being torn off or broken in the process, creating unsafe conditions and reducing the desired effectiveness of the tool. Thus, a preferred embodiment of this invention will comprise an internally positioned option for lighting as described above. However, the invention herein does contemplate an alternative embodiment that enables external attachment of a lighting element or other relevant fixtures or tool attachments along the external surface of said linear hollow tube.

The distal end of said linear hollow tube being detachably connectable to a contact tool by way of threaded connection. Said contact tool may comprise a battering plate or prying tool or any relevant type of high impact breaching tool made of dense heavy non-brittle material.

One embodiment of said contact tool comprising a heavy ramming tool with a planar terminal cross-sectional surface. Said heavy ramming tool attachable by threaded means to the proximal end of said linear hollow channel. Said heavy ramming tool may optionally have a perforated hole centrally disposed therethrough such that light shone through from the distal end as described above may shine directly through said heavy ramming tool, providing directed light towards the area in which it is being used to breach. The planar terminal surface of said heavy ramming tool that would be in direct contact with a barrier feature may comprise a variety of surface shapes or contours. For example, according to one embodiment, said external planar terminal surface of said heavy ramming tool may comprise a simple flat surface. Yet another embodiment of such may provide a flat surface with spiral groove thereon. The effect of having a spiral groove on the terminal surface of the ramming tool is that latent energy and force is captured as the tool is moved through the air towards the barrier feature. The latent force and energy is directed centrally inward by the spiral contour grooves as momentum of forceful movement is occurring, which harnesses and concentrates power centrally on the device for maximum impact effect on the barrier feature upon contact. Yet another embodiment of said planar terminal surface may comprise perforations therethrough along its circumference in an angular fashion to direct resistant force away from the battering ram head for improved speed of impact and centralized force of impact. Yet another embodiment of said planar terminal surface may comprise grooves and ridges that provides a crushing effect wherein an intact barrier is broken down into smaller components. Yet another embodiment of said planar terminal surface may comprise an externally projected concave shape for a narrower ramming effect. The diameter of said planar terminal surface is preferably at least the same or greater than the diameter or width of the distal end of said linear hollow tube.

Yet another embodiment of said contact tool is by design as a prying tool. Similar to other components of this device, the material composition of said prying tool is of a heavy, nonbrittle, hard material, preferably metal. As with other contact tools of this invention, the prying tool is removably attachable to the distal end of said linear hollow tube by manner of threaded connection. The design feature of said prying tool having an elongated tapered length terminating at either a pointed or narrowly flat end. The embodiment of the prying element having a pointed end may dually function as a spike for stabbing effect. The embodiment of the prying element having a narrower flat end may be sleevable through slits within a barrier feature for leveraged effect when attempting to pry a barrier open.

The contact tool portion of this invention is intended to be interchangeably and removably attachable to the distal end of said linear hollow tube by threaded means to create a modular tool. The connection between the components are fluid and secure. The modular feature of this device comprising essentially two connecting components, the contact tool and the linear hollow tube, to minimize excess handling or loss of important excess components. The modularization of multiple tools by this invention provides the benefit of having each of these various important tools but with half the amount of weight because they all share the same core handle portion, which is the linear hollow tube.

The first and second handles of said device each having a linear grip (respectively a first and second linear grip) that further provides a shock absorbing feature. Said shock absorbing feature of said first and second linear grip. Each of said first and second linear grip comprising a linear tube with a hollow internal space that is capped at either open ends. Said hollow internal space capable of receiving and holding granular beads. Said linear tube of each said first and second linear grip being filled with granular beads and capped securely at both ends. Said granular beads aid to absorb force that radiates towards the user's hands while the device is being gripped and impacted against hard surfaces, functioning essentially as shock absorbers. Each of said linear grips having a removable grip element sleevable over its external surface. The external surface of each said removable grip element may comprise any variety of grip contour design to enable a stronger and more comfortable grip over each said handle. Said removable grip element may comprise knurled, rotary, foam, or rubberized texture and or material.

Said linear hollow tube of this device may comprise a single tubular component or alternatively, two or more connectable components for adjustable length. One embodiment of this invention comprising a linear hollow tube having two removably connectable portions that connect by threaded means. A first portion forming the proximal end of said device and a second end forming the distal end of said linear hollow tube. Said first portion being broader than the second portion where the external surface of the distal end of said first portion fits snuggly in threaded manner over the external surface of the proximal end of said second portion. The surfaces at either referenced ends having matching male to female threading such that said first portion connects directly onto and over said second portion for a stronger integrated connection between the two components. This assures a stronger hold and continuity of force when the device is used. An alternative embodiment may provide for the reverse features such that the second portion is broader than the first portion with the same type of connection therebetween where the second portion overlays the first portion between matching threaded surrounding the external surface of their respective ends. Yet alternatively, the two portions may be of the same diameter or width and achieve a snug fit by threaded connection therebetween. However, this is a lesser preferred option due to the fact that the two pieces are not fully integrated but only connected by a threaded bridge therebetween. The bridge portion may be vulnerable to breakage and thus, less safe or reliable. The threaded connection between the two components may be located at any location along the length of said device, although preferably near the center of the device for stronger physical integrity against high force impact.

Yet according to another embodiment of this invention, said first and second hollow tubes are connectable in snug and firm manner by a threaded nut and bolt element penetrating through at least one hole of said second hollow tube and a matching hole along said first hollow tube. Along the surface of said second hollow tube where the nut and bolt attach (preferably the bottom side of said device), a wedge element extends from or is permanently welded to the surface of said device immediately forward from said nut and bolt connection location. Said wedge element is triangular in shape with a tangent that rises from lowest to highest point from forward to rearward direction of said device such that the highest point is higher than the terminal end of said nut and bolt connection. Said wedge element serves to shield the exposed nut and bolt connection from high impact action that would otherwise risk breaking the nut and bolt connection and causing separation of said first and second hollow tube. This feature of a pin connection by manner of nut and bolt elements also allow for disconnection or compaction of the device to allow for improved storage capacity with minimum use of space.

The device of this invention utilizes heavy gauged weldable iron or steel material. All fasteners and bolts of this device utilize grade number 8 material. The device further utilizes self-lubricating coating or paint for adjustment of the internal surfaces of said first and second hollow tubes. A shock absorbing gasket system is used at the connecting locations between said contact tool elements and said linear hollow tube to improve the user experience and safety for breaching and impact.

Other features, advantages, and object of the present invention will become more apparent and be more readily understood from the following detailed description, which should be read in conjunction with the accompanying drawings.

Having fully described at least one embodiment of the present invention, other equivalent or alternative methods according to the present invention will be apparent to those skilled in the art. The invention has been described by way of summary, detailed description and illustration. The specific embodiments disclosed in the above drawings are not intended to be limiting. Implementations of the present invention with various different configurations are contemplated as within the scope of the present invention. The invention is thus to cover all modifications, equivalents, and alternatives falling within the spirit and scope of the following claims.

DETAILED DESCRIPTION OF THE INVENTION

The present invention is best understood by reference to the detailed figures and description set forth herein. Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Embodiments of the invention are discussed herein with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be understood that any exact measurements, dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Reference will now be made in detail to exemplary aspects of the present invention which are illustrated in the accompanying drawings. Wherever possible, the same reference numbers will be used throughout the drawings to refer to the same or like parts.

Figure 1:
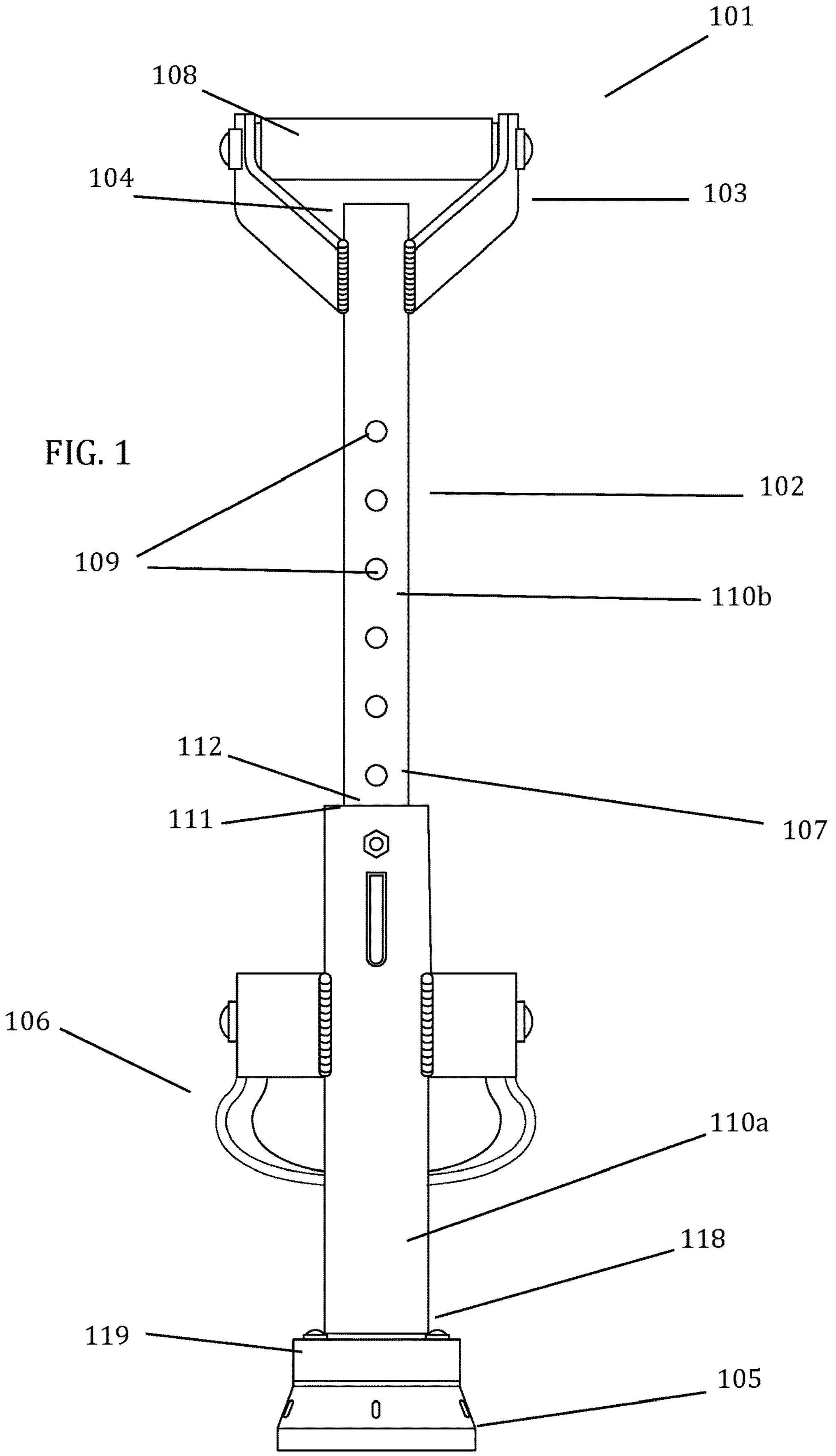
FIG. 1 is an illustration of a first embodiment of the inventive device.

FIG. 1 provides an exemplary embodiment of the inventive device 101 as described herein. The device 101 as shown comprising a linear hollow tube 102, preferably cylindrical in shape. A first handle 103 is disposed at the rear end 104 (or alternatively referred to as the distal end) of the linear hollow tube 102 and a contact tool feature 105 is located at the front end (or alternatively referred to as the proximal end) of said linear hollow tube. A second handle 106 is disposed forward from said first handle 103, extending from the bottom surface 107 of said linear hollow tube 102. Said first 103 and second 106 handles are preferably disposed along the same linear path along the length of said linear hollow tube 102. Said second handle 106 may be static in construction or alternatively adjustable in a rotatable manner to enable the user to flexibly adjust their hand grip over the device 101 while the device is in use and shifting position midair in motion. Said first 103 and second 106 handle having a linear grip 108 wherein the linear grip 108 of said first 103 and second 106 handles are parallel to each such that a user's grip between left and right hands are directed to be in parallel with each other when said device is in use. Parallel grip between right and left hands allows the user to swing the device in a rotating motion around the user's body, where the body serves as a fulcrum leverage for maximum fluidity and least amount of torque to the body.

Said linear hollow tube 102 as shown in FIG. 1 (and hidden in FIG. 2) having perforated holes 109 along its bottom surface 107 to allow pressurized air within said linear hollow tube to be forcefully released therethrough with movement and impact when in use. This helps to reduce resistant energy against the device in motion. Said perforated holes 109 are preferably located near the rear end 104 of said linear hollow tube 103. Each perforated hole is preferably between 0.5 to 1.5 inches in diameter and of equal size and distance of each other. The release of air pressure through perforated holes 109 near the rear end 104 of the linear hollow tube 102 further helps to diffuse impact force that radiates from the contact tool feature towards the first handle 103, which reduces impact force on the user's hands. The size, consistency, and location of the perforated holes 109 however is not limited to the preferred locations described above, and may be located anywhere along the length of said device 101. However, the pattern of their size and location along the surface of said device may affect the total resistance against the user and the device upon impact. Said perforated holes 109 providing additional beneficial features wherein light that is shone into the internal space of said linear hollow tube 102 will radiate outward of each hole of said perforated holes 109 to create narrow lighting for the surrounding external environment when used in a dark space. This effect of said perforated holes 109 helps to disperse light downward into the external lateral space in narrowly concentrated manner to provide visual enhancement. The concentrated channels of light radiating from each said perforated hole 109 creates discrete lighting effect such that a narrow path of area receives light to avoid excess lighting to a dark area which helps to avoid unwanted attention to users of the device.

Figure 2:
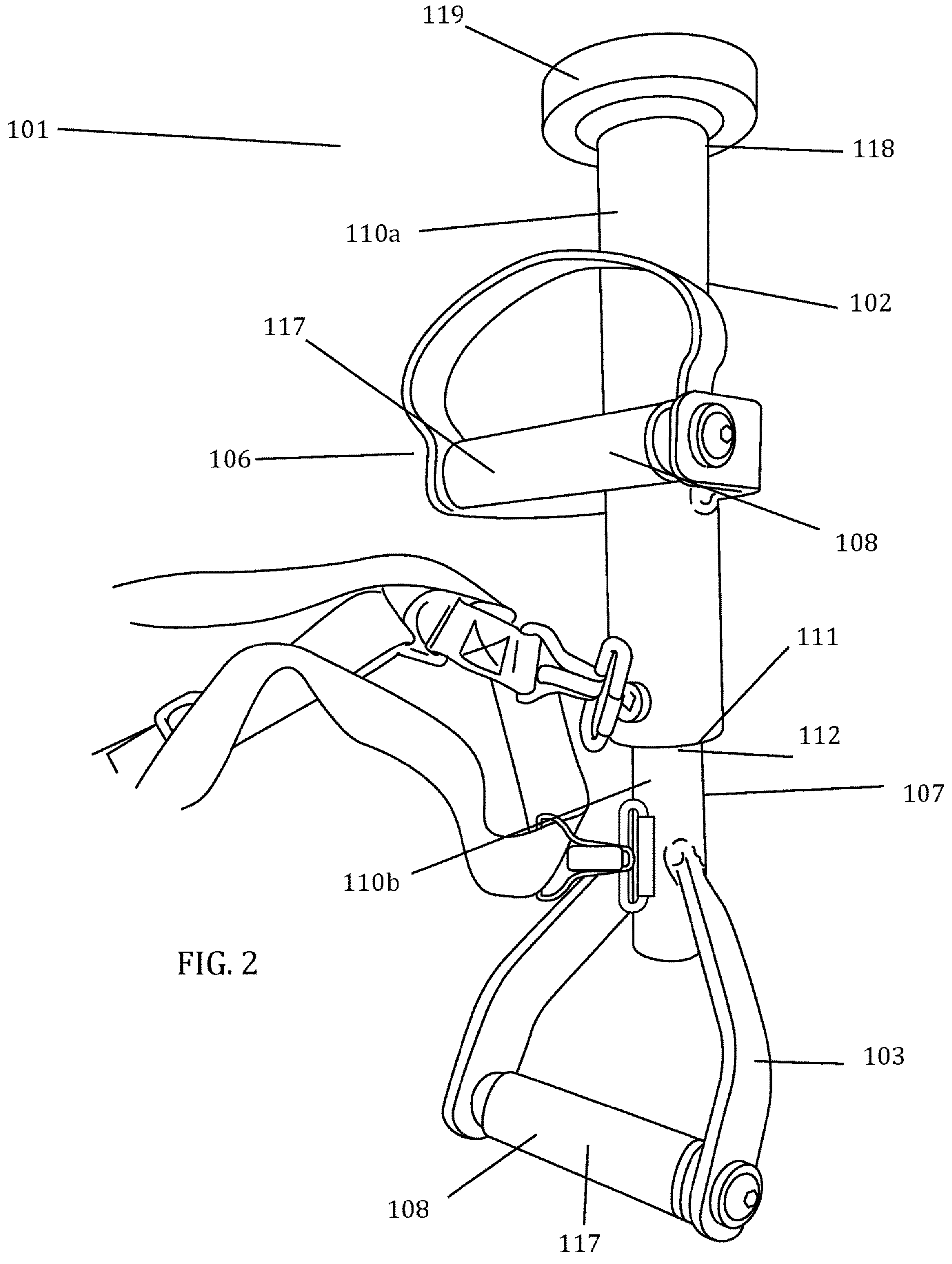
FIG. 2 is an illustration of a second embodiment of the inventive device.

Said linear hollow tube 102 of this device 101 may comprise a single continuous tubular component (not shown among the figures) or alternatively, two or more connectable components 110*a*, 110*b* for adjustable length as shown in FIGS. 1 and 2. FIG. 1 provides an exemplary illustration of the device 101 of this invention comprising a linear hollow tube having two removably connectable portions 110*a*, 110*b* that connect by threaded means. The illustration of FIG. 1 shows the two removably connectable portions 110*a*, 110*b* in connection of each other but in an extended position. The length of said device in its longest extended position whether comprising a single continuous component or alternatively of two removable connectable portions together, would be preferably no greater than 4 feet. The embodiment comprising two removable connectable portions comprising a first portion 110*a* forming the proximal (front) half of said device and a second portion 110*b* forming the distal (rear) half of said linear hollow tube. Said first proximal portion 110*a* is preferably wider in diameter than the diameter of the second distal portion 110*b* where the external surface of the distal end 111 of said first portion 110*a* fits snuggly in threaded manner over the external surface of the proximal end 112 of said second distal portion 110*b*. The diameter of said first portion 110*a* according to FIG. 2 is preferably between 1 to 6 inches. The diameter of the second portion 110*b* according to FIG. 2 is preferably between 1 to 6 inches. The length of either of said first 110*a* or second portions 110*b* may alternatively be shorter than the other. The preferred length of the second portion 110*b* according to FIG. 2 is between 12 to 18 inches long. According to yet another embodiment, the surfaces at either referenced ends having matching male to female threading such that said first portion connects directly onto and over said second portion for an integrated connection between the two components 110*a*, 110*b*. An alternative embodiment may provide for the reverse features such that the second portion 110*b* is broader than the first portion with the same type of connection therebetween where the second portion 110*b* overlays the first portion 110*a* between matching threaded surrounding the external surface of their respective ends. Yet alternatively, the two portions 110*a*, 110*b* may be of the same diameter or width and achieve a snug fit by threaded connection therebetween. In this embodiment, the two portions would connect by an intermediate bridge extending therefrom. However, this is a lesser preferred option due to the fact that the two pieces are not fully integrated but only connected by a threaded bridge therebetween (not shown in the illustrations). The bridge portion may be vulnerable to breakage and thus, less safe or reliable. The threaded connection between the two components may be located at any location along the length of said device, although preferably near the center of the device for stronger physical integrity against high force impact. The tight and adjustable connection between said first 110*a* and second portions 110*b* of said two or more connectable components of said linear hollow tube may be achieved by other known manner in the art not reliant on a threaded relationship.

Figure 3:
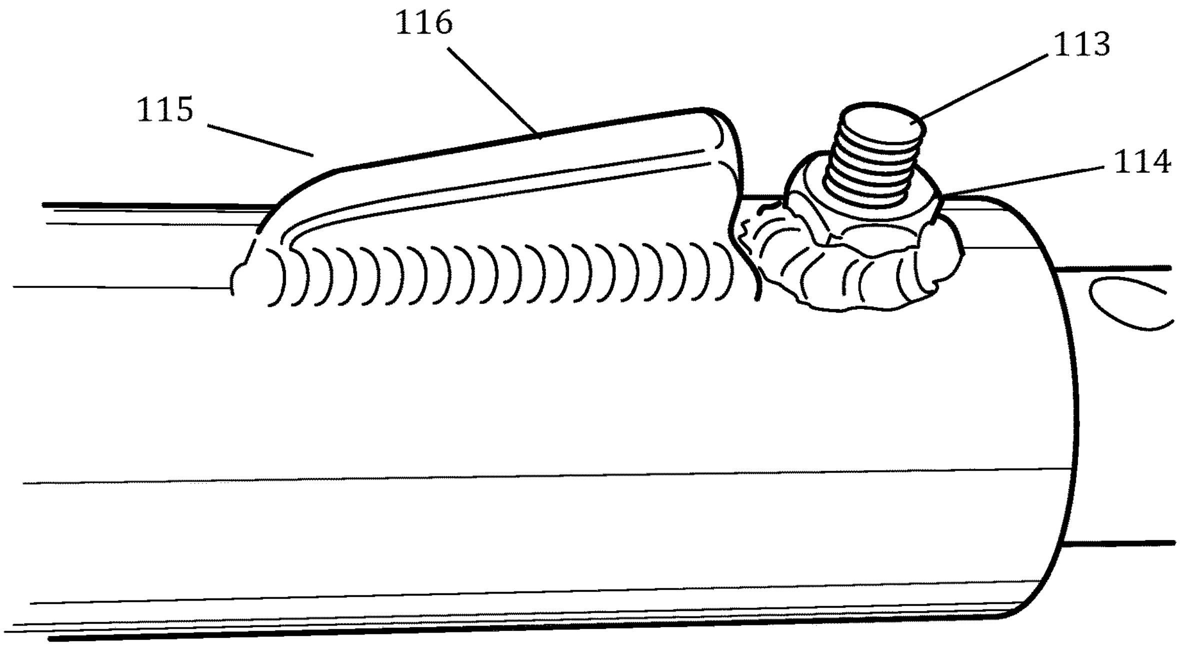
FIG. 3 is an exploded view of an exemplary feature of the inventive device.
Figure 4:
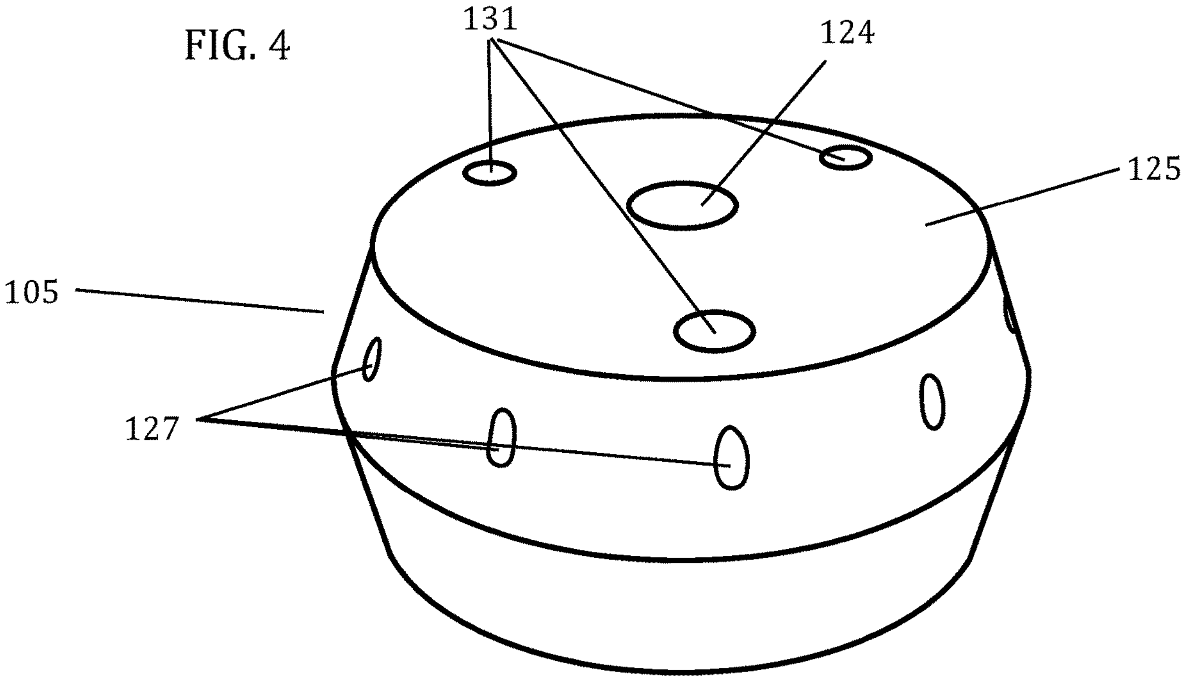
FIG. 4 is an illustration of a top side view of a first embodiment of a contact tool of the inventive device.
Figure 5:
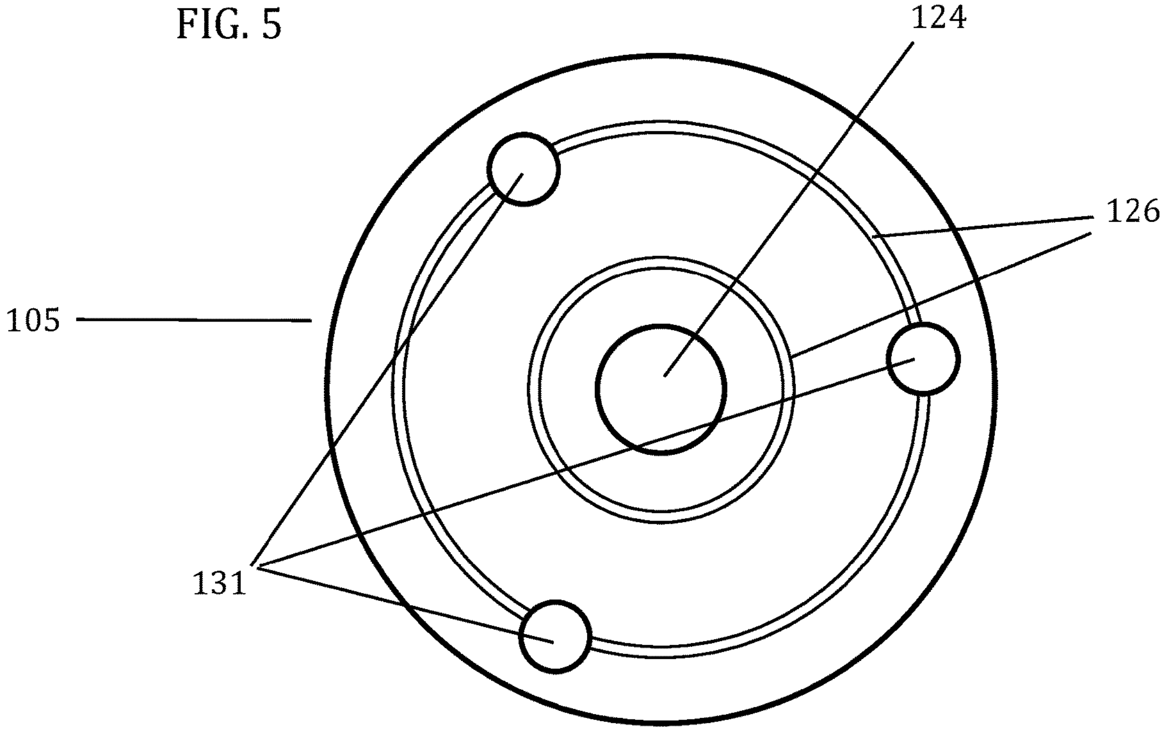
FIG. 5 is an illustration of a bottom view of a first embodiment of a contact tool of the inventive device.
Figure 6:
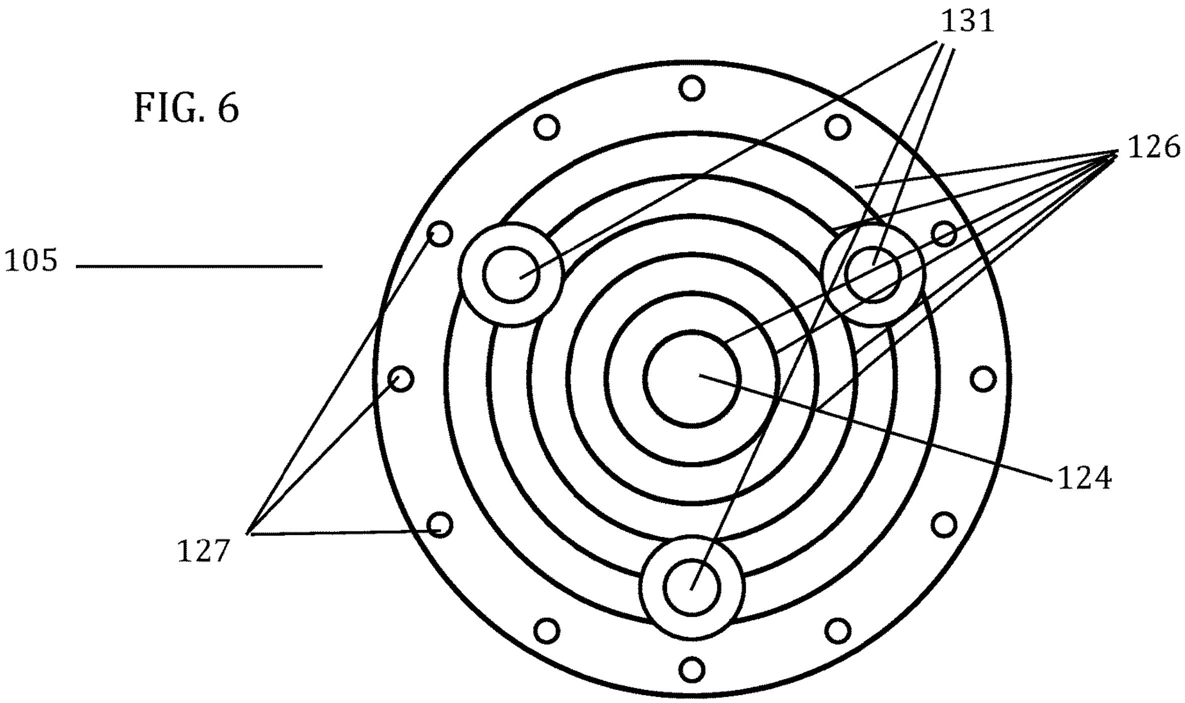
FIG. 6 is an illustration of a top view of a first embodiment of a contact tool of the inventive device.
Figure 7:
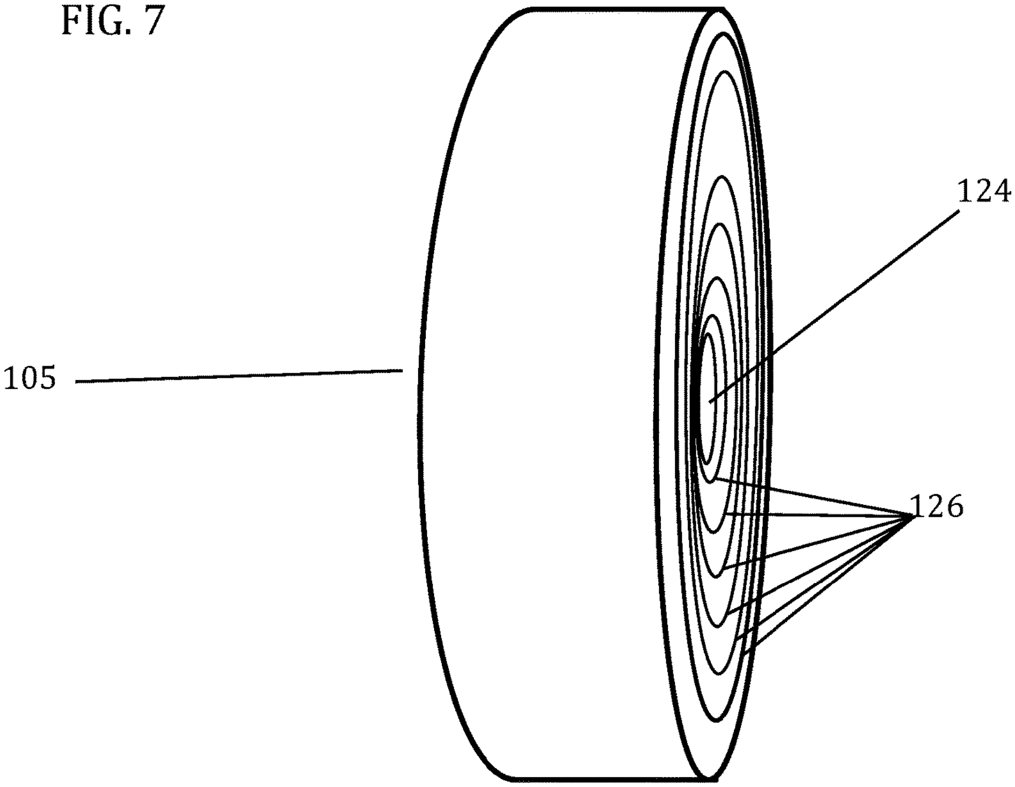
FIG. 7 is an illustration of a side view of a second embodiment of a contact tool of the inventive device.

According to an exemplary embodiment of the invention herein, FIGS. 1, 2, and 3 illustrates the method of connection between said first 110*a* and second portions 110*b* by way of a threaded screw 113 and nut 114 sleeved through perforations on the bottom surfaces of said first 110*a* and second 110*b* portions. The illustration of this embodiment utilizes the pre-set locations of said perforated holes to enable adjustment of length between a first extended position (see FIG. 1) and a second collapsed (see FIG. 2) or shortened position. Along the surface of said second portion 110*b* where the screw 113 and nut attach 114 (preferably the bottom side of said device), a wedge element 115 as shown in FIG. 3 extends from or is permanently welded to the surface of said device immediately forward from said screw 113 and nut 114 connection location. The bolt is preferably 5/16 inches in diameter. Said wedge element 115 is preferably triangular in shape with a tangent 116 that rises from lowest to highest point from forward to rearward direction along the bottom surface 107 of the linear hollow tube such that the highest point is higher than the terminal end of said screw 113 and nut 114 connection, creating a sheltering effect over said screw and nut connection. Said wedge element 115 serves to shield the exposed screw 113 and nut 114 connection from high impact action that would otherwise risk direct contact of the contact area with said screw 113 and nut 114, severing that connection and potentially separating in dangerous manner between said first and second portions. Said wedge element 115 may alternatively be rounded in shape with similar features having a lower and higher point of a tangential edge 116 where the higher point of said wedge terminates at the same or higher location relative to the top end point of said screw and nut protruding from the surface of said device. This feature of a pin connection by manner of screw 113 and nut 114 elements also allows for complete disconnection and thus compaction of the device for improved storage capacity when stored or carried in tight spaces.

The first 103 and second 106 handles of said device 101 each having a linear grip 108 (respectively a first and second linear grip) that further provides a shock absorbing feature. Each of said first and second linear grip 108 comprising a linear tube with a hollow internal space that is capped at either open ends. Said linear tube being between 5 to 6 inches in length and between 0.50 to 3 inches in diameter. Said hollow internal space capable of receiving and holding lightweight granular beads. Said granular beads aid to absorb force that radiates towards the user's hands while the device is being gripped and impacted against hard surfaces, functioning essentially as shock absorbers. Each of said linear grips 108 having a removable grip 117 element sleevable over its external surface. Said removable grip 117 element preferably having a durable, elastic, and viscous texture similar to the texture of rubber or neoprene. The external surface of each said removable grip 117 element may comprise any variety of grip contour design to enable a stronger and more comfortable grip over each said handle. Said removable grip 117 element may comprise knurled, rotary, foam, or rubberized texture, design, and or material.

At the center of the cross-sectional end at the distal side 110*b* of said linear hollow tube (not shown in the illustrations) according to the embodiment of FIGS. 1 and 2, a threaded hole or threaded sleeve opening is provided wherein a flashlight may be snuggly sleeved in and securely connectable by threaded manner. The diameter of said threaded hole at the cross-sectional end as described above is preferably between 0.50 inch to 2 inches in diameter. The threaded feature of this portion of the device is adaptable to the threading of the head of a typical commercial linear portable handheld flashlight in matching manner. Where the cover element of a typical hand-held flashlight is removable by threaded manner, exposing the LED or bulb elements of the flashlight, may be attached by its exposed threading at that head portion (the location of the LED or bulb elements) to a matching threading within the internal space of said linear hollow tube at its proximal end to connect the two devices together. Essentially, the device of this invention takes advantage and makes use of available threading of a standard commercial handheld flashlight by removal of the light cover and exposing the threading underneath. The line of sight and line of lighting of the flashlight when it is attached and in use is shared between the proximal end and distal ends of said linear hollow device such that light shone from the proximal end is dispersed through an optional perforated hole at the cross-sectional end of the distal side of said linear hollow tube (see, FIGS. 4, 5, 6, 7).

The terminal end 118 of said device 101 at its proximal front end (opposite of the handle element on the rear end) comprising a flat base plate 119. Said flat base plate 119 according to the embodiment shown on FIGS. 1 and 2 having a width of preferably between 0.5 to 2 inches thick and a diameter of preferably 4 inches. Said flat base plate 119 further having perforations (not shown within the illustrations) therethrough its width at equal distance. Said flat base plate 119 having at least 3 or more perforations equal distance from each other therethrough. The diameter of each said perforations of said at least 3 or more perforations being at least 5/16 inches wide. Said flat base plate 119 further having a larger perforation centrally located therethrough of at least ½ inch and preferably at least ¾ inches in diameter. The internal surface of each said perforations may be either smooth or threaded. Each said perforation, with exception of the larger central perforation, is able to receive a screw or pin element therethrough.

The distal end of said linear hollow tube being detachably connectable to a contact tool 105 (see FIGS. 4, 5, 6, 7, 8, 9, 10) by way of threaded connection. Said flat base plate 119 as described above is attachable to a contact tool 105 by manner of bolt or pin connection through matching perforated holes. Said contact tool 105 comprising a heavy base plate 105 and optionally additional features extending therefrom. Said contact tool 105 may comprise a battering plate (see FIGS. 4, 5, 6, 7) or prying tool (see FIGS. 8, 9, 10) or any relevant type of high impact breaching tool made of dense heavy non-brittle material. One embodiment of said contact tool 105 comprising a heavy ramming plate 105 (see also FIGS. 4-7) with a planar terminal cross-sectional surface. Said heavy ramming plate 105 attachable by threaded means to the flat base plate 119 at the proximal end of said linear hollow channel. Alternatively, as presented in FIGS. 4, 5, 6, and 7, said heavy ramming plate may optionally have a perforated hole 124 centrally disposed therethrough such that light shone through from the distal end of said device. The rear side of said heavy ramming plate 105 having a flat surface 125 to establish a flush contact and connection with the flat surface of said flat base plate 119. The front side of said heavy ramming plate 105 may comprise a variety of shapes or contours 126 for a desired contact with a breaching surface. For example, according to one embodiment, said front side of said heavy ramming plate 105 may comprise a simple flat surface. Yet another embodiment of such may provide a flat surface with spiral groove 126 thereon. The effect of having a spiral groove 126 on the front surface of the ramming plate 105 is that latent energy and force is captured as the tool is moved through the air towards the barrier feature. The latent force and energy is directed centrally inward by the spiral contour grooves 126 as momentum of forceful movement is occurring, which harnesses and concentrates power centrally on the device for maximum impact effect on the barrier feature upon contact. Yet another embodiment of said front side surface may comprise perforations 127 (see FIGS. 4 and 6) therethrough along its circumference in an angular fashion to direct resistant force away from the battering ram head for improved speed of impact and centralized force of impact. Yet another embodiment of said planar terminal surface may comprise grooves and ridges that provides a crushing effect wherein an intact barrier is broken down into smaller components. Yet another embodiment of said planar terminal surface may comprise an externally projected concave shape for a narrower ramming effect. The diameter of said planar terminal surface is preferably at least the same or greater than the diameter or width of the diameter of the flat base plate of said linear hollow tube.

Figure 8:
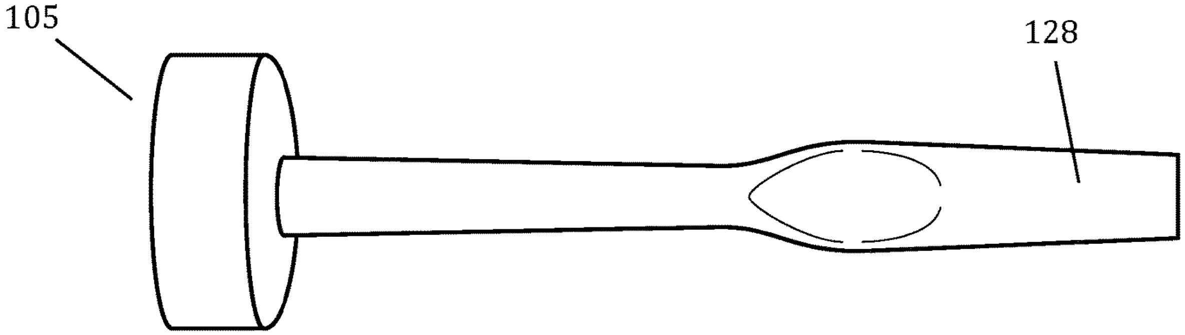
FIG. 8 is an illustration of a third embodiment of a contact tool of the inventive device.
Figure 9:
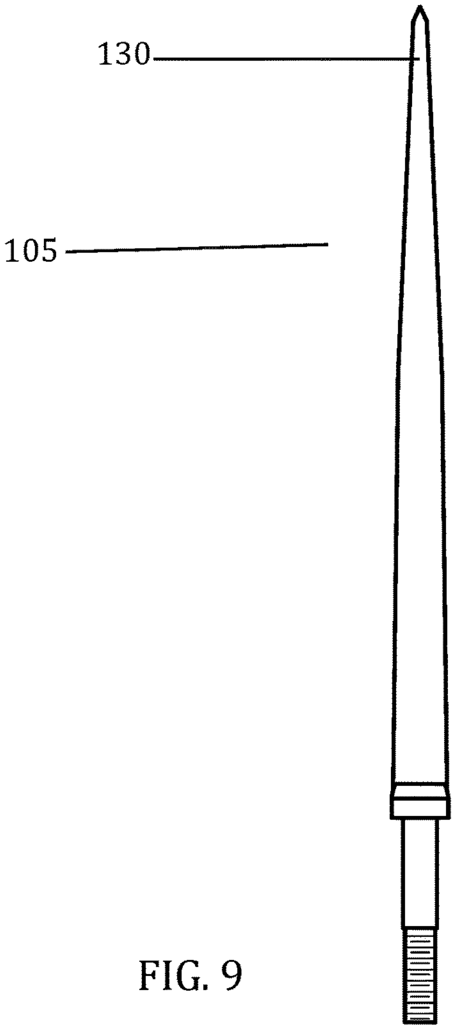
FIG. 9 is an illustration of a fourth embodiment of a contact tool of the inventive device.
Figure 10:
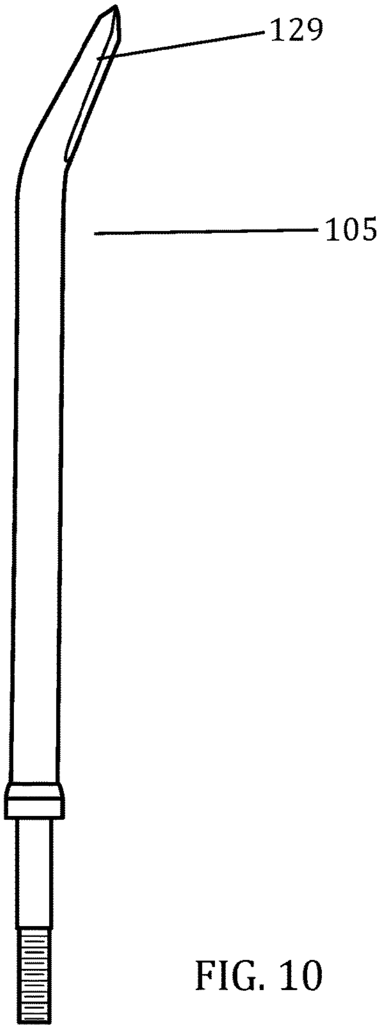
FIG. 10 is an illustration of a fifth embodiment of a contact tool of the inventive device.

Yet another embodiment of said contact tool 105 is by design as a prying tool 128, 129, 130 as shown according to FIG. 8. Similar to other components of this device, the material composition of said prying tool 128, 129, 130 is of a heavy, nonbrittle, hard material, preferably metal. As with other contact tools of this invention, the prying tool 128, 129, 130 is removably attachable to the distal end of said linear hollow tube by manner of threaded connection. The design feature of said prying tool 128, 129, 130 having an elongated tapered length extending from a flat heavy ramming plate and terminating with either a pointed 130 or narrowly flat end 128, 129 as shown in FIGS. 9 and 10. The embodiment of the prying element 128, 129, 130 having a pointed end as shown in FIG. 9 may dually function as a spike 130 for stabbing effect. The embodiment of the prying element having a narrower flat end may be sleevable through slits within a barrier feature for leveraged effect when attempting to pry a barrier open.

The contact tool 105 portion of this invention is intended to be interchangeably and removably attachable to the distal end of said linear hollow tube by threaded means to create a modular tool. The connection between the components are fluid and secure. The modular feature of this device comprising essentially two connecting components 110*a*, 110*b* forming the linear hollow tube and the contact tool 105, to minimize excess handling or loss of important excess components. The modularization of multiple tools by this invention provides the benefit of having each of these various important tools but with half the amount of weight because they all share the same core handle portion, which is the linear hollow tube.

The invention claimed is:

1. A modular battering ram comprising:

a linear hollow tube having a front and rear end, a top and bottom surface, a first and second handle element, and a flat base plate, said linear hollow tube having two or more removably connectable portions comprising a front and rear portion, said two or more connectable portions each having a linear body, said two or more connectable portions are connectable to each other at variable and adjustable locations along the length of their bodies, said rear portion having a plurality of perforations along its surface configured to engage in a connecting manner with said front portion by a pin element, a wedge element extending from said linear hollow tube adjacent to said pin element and comprising a height extending from said linear hollow tube that is greater than the height of said pin element extending from said linear hollow tube, said first and second handle element is each attached to said linear hollow tube, said first handle is disposed at the rear end of the linear hollow tube oppositely from said flat base plate, said second handle is disposed forwardly from said first handle, extending from the top surface of said linear hollow tube, said first and second handle each having a linear grip element wherein each said linear grip element of said first and second handles are positioned parallel to each other, said flat base plate is attached to said front end of said linear hollow tube, and a contact tool removably connectable to said flat base plate, said modular battering ram comprising metallic material.

2. The modular battering ram of claim 1 wherein said contact tool is comprising a flat ramming plate, a spike, or a prying tool.

3. The modular battering ram of claim 2, wherein any of each of said contact tool is interchangeably connectable to said flat base plate.

4. The modular battering ram of claim 1, wherein a flashlight device is removably connectable to the rear end of said linear hollow tube.

5. The modular battering ram of claim 1, wherein the flat base plate having a perforation centrally disposed therethrough.

6. The modular battering ram of claim 1, wherein said contact tool having a perforated hole centrally disposed therethrough.

7. A modular battering ram system comprising a battering ram according to claim 1, said battering ram is removably attachable to at least one of a plurality of contact tools, each said at least one contact tool of said plurality of contact tools is removably attachable to said battering ram in an interchangeable manner.

8. A modular battering ram comprising:

a linear hollow tube having a front and rear end, and a top and bottom surface, a first and second handle element, and a flat base plate, said linear hollow tube having two or more removably connectable portions comprising a front and rear portion, said two or more connectable portions each having a linear body, said two or more connectable portions are connectable to each other at variable and adjustable locations along the length of their bodies, said rear portion having a plurality of perforations along its bottom surface configured to engage in a connecting manner with said front portion by a pin element, a wedge element extending from said linear hollow tube adjacent to said pin element and comprising a height extending from said linear hollow tube that is greater than the height of said pin element extending from said linear hollow tube, said first and second handle element is each attached to said linear hollow tube, said first handle is disposed at the rear end of the linear hollow tube oppositely from said flat base plate, said second handle is disposed forwardly from said first handle, extending from the top surface of said linear hollow tube, said first and second handle each having a linear grip element wherein each said linear grip element of said first and second handles are positioned parallel to each other, said flat base plate is attached to said front end of said linear hollow tube, said flat base plate having a perforation centrally disposed therethrough, wherein a flashlight device is removably connectable to said linear hollow tube said modular battering ram comprising metallic material.

* * * * *